Dec. 31, 1963    R. F. CORNISH ETAL    3,115,790
ADJUSTABLE LENGTH DIFFERENTIAL THRUST BLOCK OR THE LIKE
Filed May 10, 1962    2 Sheets-Sheet 1
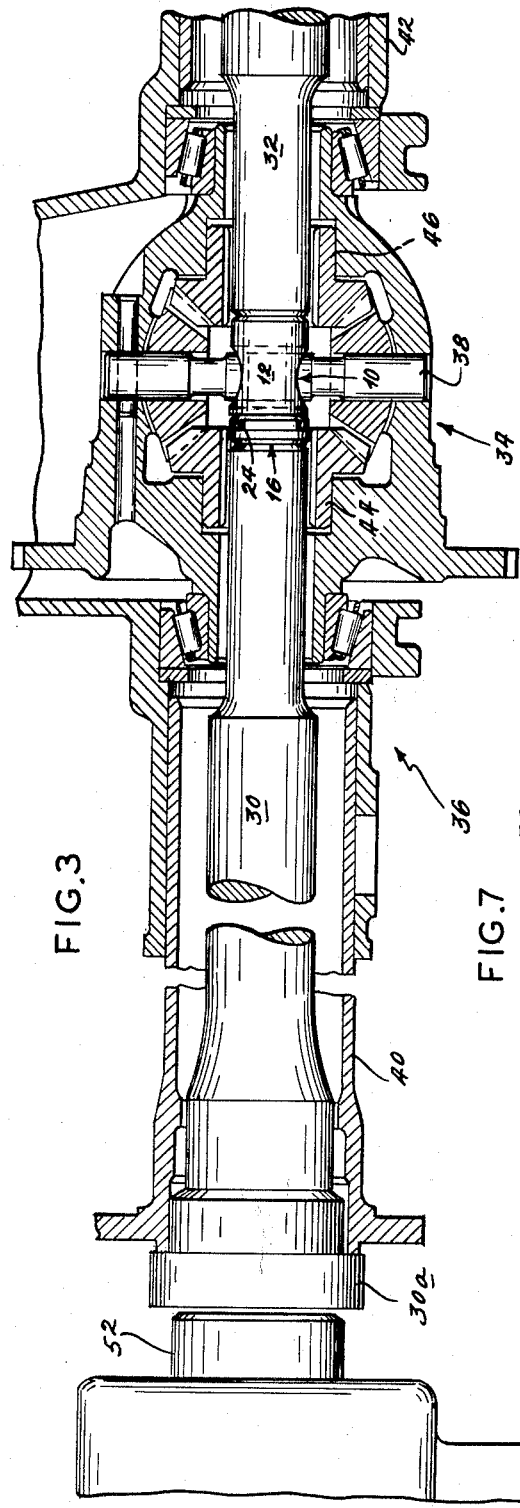
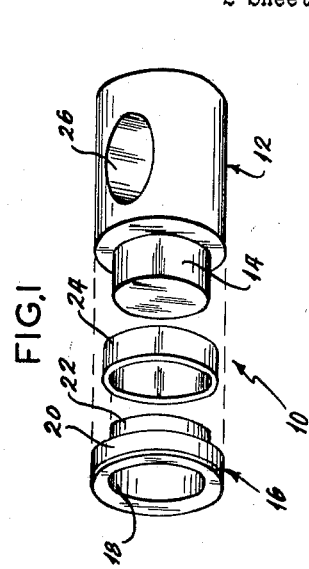
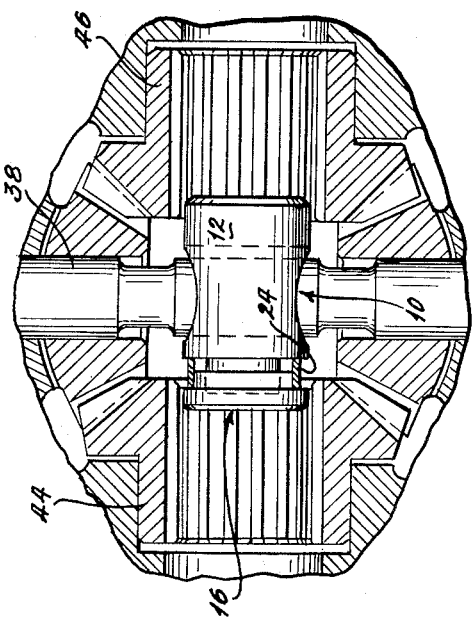
INVENTOR.
ROBERT F. CORNISH
BY  ROBERT H. LOGAN
Gravely, Lieder & Woodruff
ATTORNEYS.

Dec. 31, 1963  R. F. CORNISH ETAL  3,115,790
ADJUSTABLE LENGTH DIFFERENTIAL THRUST BLOCK OR THE LIKE
Filed May 10, 1962  2 Sheets-Sheet 2
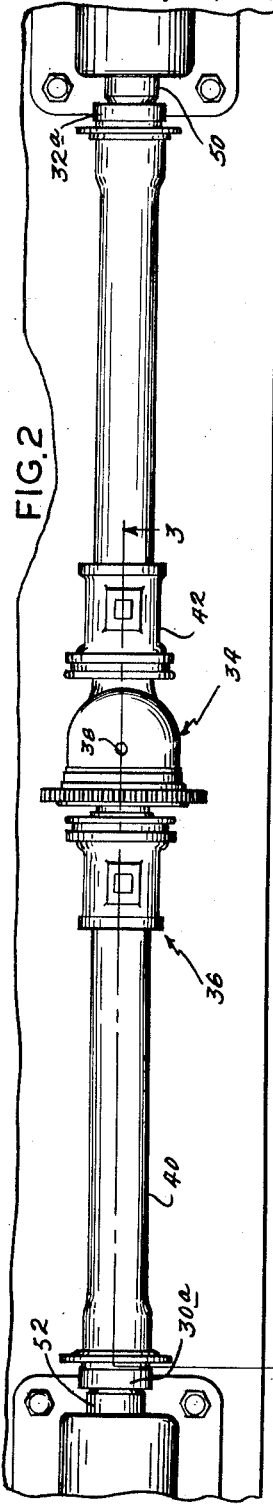
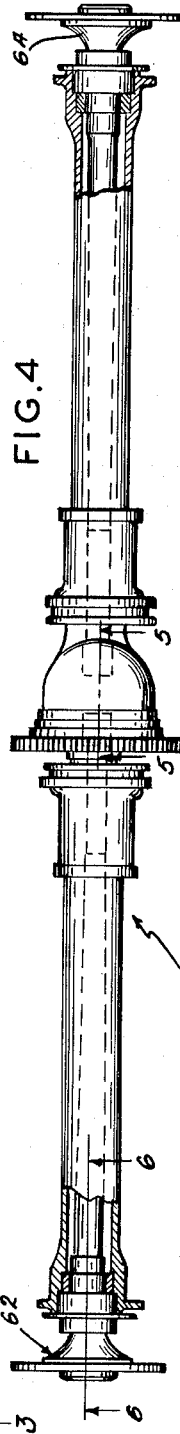
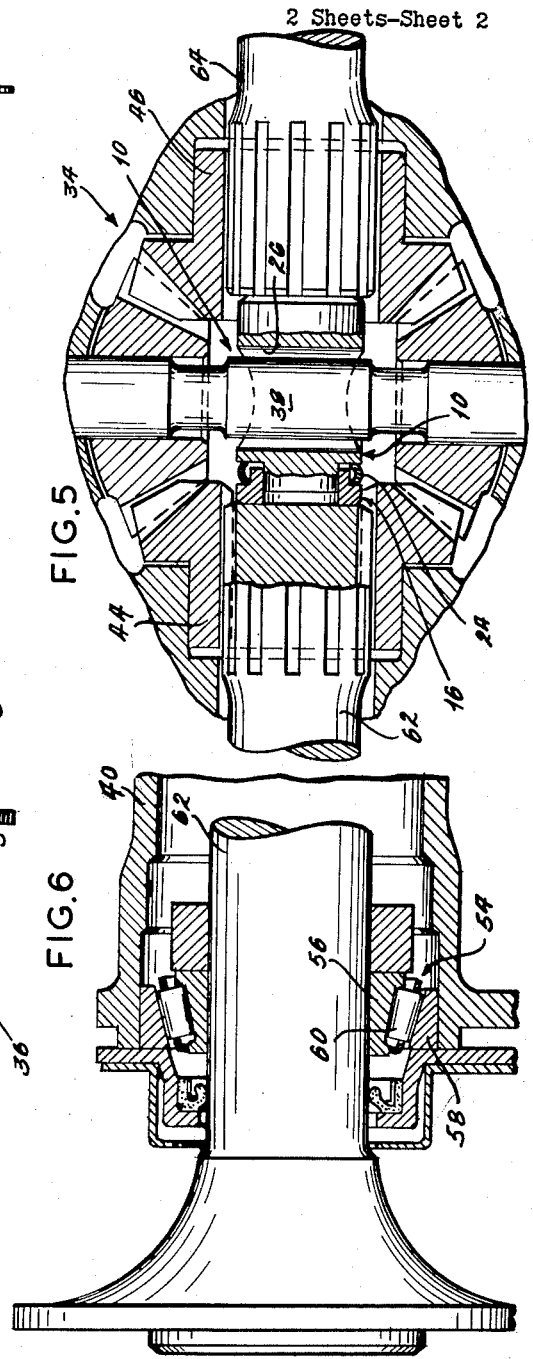
INVENTORS:
ROBERT F. CORNISH
ROBERT H. LOGAN
BY
Gravely, Lieder & Woodruff
ATTORNEYS.

United States Patent Office 3,115,790
Patented Dec. 31, 1963

3,115,790
ADJUSTABLE LENGTH DIFFERENTIAL THRUST
BLOCK OR THE LIKE
Robert F. Cornish, North Canton, and Robert H. Logan,
Canton, Ohio, assignors to The Timken Roller Bearing
Company, Canton, Ohio, a corporation of Ohio
Filed May 10, 1962, Ser. No. 193,824
8 Claims. (Cl. 74—713)

The present invention relates generally to thrust blocks or spacer devices and more particularly to a thrust block or spacer for between axle shafts in a differential assembly or the like.

It has long been a problem particularly of the automotive industry to provide means for accurately and economically spacing axle shafts such as rear axle shafts mounted on tapered roller bearings and extending into differential assemblies. This is especially so because the axle shafts must be freely and relatively rotatable while at the same time their spacing must be maintained in order to properly maintain the adjustment of the bearings. Most known spacer devices have included relatively movable members with complicated adjustment means requiring relatively skilled personnel to install and adjust.

The present device overcomes these and other undesirable features of known spacer devices, and at the same time provides a relatively inexpensive device which is particularly well suited to factory assembly techniques and which can be accurately preset without requiring continuing adjustment and maintenance in the field.

The present device comprises a thrust block or spacer for between aligned axle shafts in a differential assembly or the like and comprises a cylindrical body with a reduced diameter cylindrical extension or projection at one end thereof, an annular collar having an opening adapted to be fitted to the reduced diameter extension, said collar having a larger diameter portion of substantially the same diameter as the cylindrical body and a small diameter portion on the side thereof toward the cylindrical body, and an annular ring positioned on the smaller diameter portion of the collar and having a length greater than the axial length of the smaller diameter portion of the collar in the axial direction, said ring being collapsible in the axial direction when the collar and body are pressed together to provide a predetermined length for the thrust block or spacer.

It is a main object of the present invention to provide relatively inexpensive, easy to install thrust block or spacer means for between axle shafts in a differential assembly or the like.

Another object is to provide thrust block or spacer means that are readily adaptable to factory assembly and adjustment techniques.

Another object is to provide a thrust block that will not lose adjustment or come loose.

Another object is to provide simple to construct inexpensive means to maintain the spacing between relatively rotatable aligned shaft members.

Another object is to provide means for adjusting bearing assemblies such as the bearing assemblies associated with axle shafts in differential assemblies and the like.

Another object is to simplify the assembly, installation and adjustment of differential assemblies and the like.

These and other objects and advantages of the present invention will become apparent after considering the following detailed description of a preferred embodiment in conjunction with the accompanying drawings, wherein:

FIG. 1 is an enlarged exploded perspective view of a thrust block or spacer device constructed according to the present invention;

FIG. 2 is a side view of a differential assembly and associated structure positioned in a press;

FIG. 3 is an enlarged cross-sectional view taken on line 3—3 of FIG. 2;

FIG. 4 is a view similar to FIG. 2 showing wheel and bearing assemblies mounted on the structure;

FIG. 5 is an enlarged fragmentary cross-sectional view taken on line 5—5 of FIG. 4;

FIG. 6 is an enlarged fragmentary cross-sectional view taken on line 6—6 of FIG. 4; and FIG. 7 is a view similar to FIG. 5 showing the subject thrust block or spacer device in assembled but uncompressed condition.

Referring to the drawings by reference numbers, number 10 refers generally to a thrust block or spacer device constructed according to the present invention. As shown in FIG. 1 the thrust block or spacer 10 is constructed of three parts, namely, a cylindrical body portion 12 with a smaller diameter cylindrical extension 14 on one end thereof; an annular collar 16 with a cylindrical bore 18 small enough to be press fitted on the extension 14, said collar having a larger portion 20 of substantially the same outside diameter as the portion 12 and a smaller diameter portion 22; and an annular ring or sleeve 24. The sleeve 24 has an inside diameter large enough to receive the collar portion 22, and the sleeve 24 also is wider axially than the collar portion 22. The body portion 12 of the spacer 10 also has a cross bore 26 therethrough for purposes which will be shown hereinafter.

The thrust block or spacer 10 is constructed to be installed between spaced and aligned axle shafts connected to a differential subassembly 34 or the like which is part of a rear axle assembly 36. The block is assembled in the subassembly 34 as illustrated in FIG. 3 with a pinion shaft 38 extending loosely through the opening or cross bore 26 across the subassembly 34. When assembled, and before the rear axle shafts are installed, gauge length plugs 30 and 32 are inserted endwardly into associated rear axle housing members 40 and 42 respectively and through bores in associated differential gears 44 and 46 respectively. In this position, the ends of the plugs engage opposite ends of the thrust block 10, and the sleeve portion 24 has a cylindrical tubular shape as shown in FIG. 7.

The whole rear axle assembly 36 with the gauge plugs 30 and 32 inserted is then placed in a press as shown in FIGS. 2 and 3. The press includes a stationary ram 50 that engages a shoulder portion 32a on one end of one of the gauge plugs 32 (or 30) and a movable ram 52 that engages a shoulder portion 30a on the opposite end of the other gauge plug 30 (or 32). The press is then operated to force the gauge plugs 30 and 32 toward each other against opposite ends of the thrust block 10 until the shoulders 30a and 32a on the gauge plugs 30 and 32 respectively contact the housings 40 and 42. During the course of the ramming operation the plugs 30 and 32 press the collar 16 toward the body portion 12 on the extension 14. While this is taking place, the sleeve 24 is compressed axially and partially collapses into a condition such as is illustrated in FIGS. 3 and 5. The way the sleeve 24 collapses and yet maintains the final dimension of the block or spacer 10 is important to the invention because it maintains the spacing between the axle shafts 62 and 64 when they are subsequently installed in the assembly.

Maintaining the spacing between the axle shafts is particularly important to a construction such as is shown in FIGS. 4 and 6 wherein tapered roller bearings are used to mount the axle shafts 62 and 64 because this maintains the desired adjustment of the bearing members. A typical tapered roller bearing assembly 54 is shown in FIG. 6 and includes an inner race member 56, an outer race member 58, and a plurality of rollers 60 positioned therebetween. In a tapered bearing assembly, as already noted, the axial positions of the inner and outer races determines the adjustment of the bearing assembly and this in turn is determined by proper compression of the spacer 10 by the gauge length plugs 30 and 32.

The deformed spacer 10 will therefore maintain the preset spacing between the axle shafts and the bearing adjustment. Furthermore, by having the sleeve portion 24 of the spacer 10 annular in shape forces are evenly distributed between the collar 16 and the body 12 to prevent cocking and binding of the members.

Thus there has been shown and described novel spacer means for maintaining a preset spacing between two members such as between shaft sections associated with a differential assembly. Obviously, however, the present spacer can also be used in devices other than the one shown herein to illustrate the invention, and it is not intended therefore to limit its use to a particular device or use. It is also anticipated that many changes, modifications, and variations of the subject device will become apparent to those skilled in the art after considering this disclosure. All such changes, modifications and variations which do not depart from the spirit and scope of the invention are deemed to be covered by the invention which is limited only by the claims which follow.

What is claimed is:

1. A spacer device comprising a first member having opposite surfaces and a projection extending from one of said surfaces, a second member having an opening therein to receive the projection, and a ring of material positioned around the projection and between the first and second members, said ring being collapsible in the space between said members when pressure is applied to force the second member toward the first member on the projection, said ring being of a material capable of maintaining a predetermined collapsed condition.

2. A spacer for maintaining a predetermined space between two objects comprising a first member having opposed surfaces with a projection extending outwardly from one of said surfaces, a second member having an opening to receive said projection, and a wall element positioned between the first and second members around the said projection, said wall element partially collapsing when the said members are forced toward each other with the wall element therebetween, said element being constructed of a material capable of retaining a predetermined collapsed condition to maintain the spacing between the members.

3. Spacer means comprising male and female members adapted to be movable one onto the other, an abutment surface on each of said members, the abutment surfaces on said members being spaced from each other but movable toward each other as the female member is moved onto the male member, a wall element of a collapsible material positioned between the spaced abutment surfaces, said element undergoing partial collapse when the abutment surfaces are forcibly moved toward each other with the wall element therebetween.

4. A spacer for maintaining a predetermined space between aligned and relatively rotatable shaft sections comprising a pair of spaced aligned and relatively rotatable shaft sections, a first member positioned between the spaced sections, said member having one surface engageable with one of said sections and an extension opposite said surface extending toward the other section, a second member having an opening therein adapted to receive the said extension, said second member having a surface for slidable engagement with the other shaft section and a shoulder portion on the opposite side thereof from said surface, a ring of a collapsible material positioned on said shoulder portion, said ring being wider in the axial dimension of the sections than the shoulder and said ring being capable of partially collapsing between said members in the axial dimension when the shaft sections are pressed toward each other against opposite surfaces on the spacer members.

5. The spacer defined in claim 4 wherein said ring collapses by bulging radially outwardly at the center thereof.

6. Means for maintaining a spaced condition between aligned shaft sections comprising a pair of spaced, aligned and relatively rotatable shaft sections, a tapered bearing assembly having an inner race mounted on each of said shaft sections, said bearing assemblies being arranged to undergo loading as the shaft sections are moved away from each other, and spacer means positioned between the shaft sections for maintaining a predetermined spaced condition between said sections and a predetermined adjustment of the bearing assemblies, said spacer means comprising a first member having opposed surfaces one of which is engageable with one end of one of said sections and the other of which has an extension thereon that extends toward the other shaft section, a second member slidably positioned on said extension and having a surface engageable with said other shaft section, and a ring element positioned between the first and second members on said extension, said element collapsing axially between said members when the shaft sections are pressed toward each other against opposite surfaces of said members, said ring element being constructed of a material capable of retaining a predetermined collapsed condition to maintain a predetermined spacing between the shaft sections and a predetermined adjustment of the tapered bearing assemblies.

7. In a differential assembly or the like including a housing having a pair of spaced gears positioned therein, aligned openings extending through said housing and said gears, a pair of spaced and aligned shaft sections extending through said housing opening and into the gear openings, and tapered bearing assemblies having inner races mounted respectively on each of said shaft sections outwardly of said gears, outer races in said housing, and bearing rollers positioned between said inner and outer races, the bearing assemblies associated with each of said shaft sections being arranged to undergo loading as the associated shaft sections move away from each other, the improvement comprising means for maintaining a predetermined spaced condition between aligned shaft sections in the differential assembly or the like including a thrust block positioned in the differential assembly between the shaft sections for maintaining a predetermined spaced condition between said shaft sections and a predetermined load adjustment of the bearing assemblies, said thrust block comprising a first member having a surface engageable with one end of one of said shaft sections and a projection extending therefrom toward the other shaft section, a second member press fitted onto said projection and having a surface engageable with the other shaft section, and a ring element positioned between said first and second members and extending around said projection, said element collapsing to a predetermined condition between said members when the said second member is fitted onto the projection of the first member, said thrust block maintaining a predetermined spaced condition of the shaft sections and a predetermined load adjustment of the tapered bearing assemblies.

8. In the differential assembly defined in claim 7 said ring element is annular.

References Cited in the file of this patent

UNITED STATES PATENTS 1,513,966     Church _____ Nov. 4, 1924

FOREIGN PATENTS 7,980     Great Britain _____ Apr. 6, 1913